United States Patent [19]
Okami et al.

[11] Patent Number: 5,654,071
[45] Date of Patent: Aug. 5, 1997

[54] ANTI-DUST GEL SHEET

[75] Inventors: Takehide Okami; Tokio Sekiya; Takeshi Hashimoto, all of Usui-gun, Japan

[73] Assignee: Shin-Etsu Chemical Co., Ltd., Tokyo, Japan

[21] Appl. No.: 463,786

[22] Filed: Jun. 5, 1995

[30] Foreign Application Priority Data

Jun. 10, 1994 [JP] Japan .................................. 6-152924

[51] Int. Cl.$^6$ .......................... B32B 5/12; B32B 25/20; B32B 27/36; C09K 3/10
[52] U.S. Cl. .................. 428/109; 277/227; 277/228; 277/229; 277/237 A; 277/DIG. 4; 428/110; 428/215; 428/332; 428/337; 428/447; 428/451; 428/452; 442/43; 442/46; 442/47
[58] Field of Search ................................ 277/227, 228, 277/229, 237 A, DIG. 4; 428/109, 110, 247, 255, 266, 213, 215, 332, 337, 447, 451, 452

[56] References Cited

U.S. PATENT DOCUMENTS 4,587,159 5/1986 Gutek et al. ........................ 428/251
4,666,765 5/1987 Caldwell et al. .................... 428/266

Primary Examiner—D. S. Nakarani
Attorney, Agent, or Firm—Millen, White, Zelano, & Branigan, P.C.

[57] ABSTRACT

An anti-dust gel sheet characterized in being formed from layers of a silicone gel, having a penetration of 20–130 after curing, coated on both sides of a sheet like reinforcing material is disclosed. Since the sheet has a suitable penetration, damage of the sheet does not easily occur and it can therefore be used repeatedly.

9 Claims, 2 Drawing Sheets

ANTI-DUST GEL SHEET

FIELD OF THE INVENTION

This invention relates to an anti-dust gel sheet, and more specifically, to an anti-dust gel sheet suitable for use as a filter seal in clean rooms.

BACKGROUND OF THE INVENTION

Recently, electronic components of computers and word processors have been reaching still higher levels of integration. All manufacturing processes, from those that produce integrated circuit devices such as IC and LSI in instruments or storage device peripherals such as FD and HDD to those that produce semiconductor wafer starting materials, and patterning, semiconductor chip manufacture and semiconductor production, are now required to be carried out in clean rooms in order to improve the reliability of the products.

In the past, sufficient time has been available for installing filters in new clean rooms in factories. Gaps around filters were therefore sealed off from the outside atmosphere by a condensation curing type silicone sealant that cures at room temperature, or an addition curing type silicone gel that cures at room temperature (Tokkai Sho 62-34978, Official Gazette).

As ventilation filters in clean rooms have a fine mesh, they tend to clog easily with dirt and have to be frequently replaced.

According to the aforesaid conventional method, however, curing takes time, so several days are required for filter installation. This means that work in a clean room that is already operating must be interrupted for several days.

Moreover, as filters are embedded in the ceiling or the floor, sealing work often has to be performed in narrow or dark locations. This may lead to imperfections when gaps are filled with sealing materials so that it impossible to maintain the required degree of cleanliness.

The inventors, as a result of extensive studies of the aforesaid disadvantages, discovered that by using an anti-dust gel sheet having a reinforcing material as an intermediate layer, the penetration of this sheet lying within specified limits after curing, filter replacement in dark or narrow locations could be simplified, and filter replacement could be performed in a short time period.

SUMMARY OF THE INVENTION

It is therefore an object of this invention to provide an anti-dust gel sheet that simplifies the task of filter replacement in dark or narrow locations, and permits filter replacement to be carried out in a short time period.

It is a second object of this invention to provide an anti-dust gel sheet suitable for use as a filter seal in clean rooms.

The above objects of the invention are attained by an anti-dust gel sheet characterized in being formed from silicone gel layers, having a penetration of 20–130 units according to ASTM Designation D 1403-83 (¼ scale Cone Penetrometer) after curing, on both sides of a sheet like reinforcing material.

The anti-dust gel sheet according to this invention simplifies filter replacement in dark or narrow locations and permits filter replacement to be carried out in a short time period. In addition, as the sheet has a suitable penetration, damage of the sheet does not easily occur and it can therefore be used repeatedly.

Figure 1:
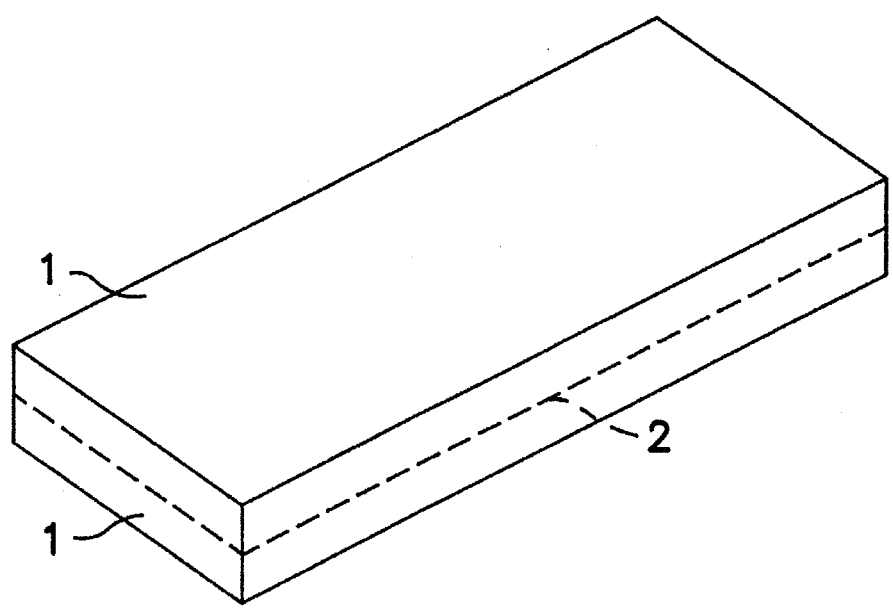
FIG. 1 shows the structure of an anti-dust gel sheet according to this invention.

In Figure, number 1 is a silicone gel, 2 is a mesh type reinforcing material, 3 is a filter component, 4 is a anti-dust gel sheet, 5 is filter support frame, 6 is a mesh type reinforcing material, 7 is a ceiling frame, 8 is a PET film, 9 is a liquid silicone gel composition, 10 is a polyester fabric, 11 is a cured silicone gel sheet, and 12 is a frame.

DETAILED DESCRIPTION OF THE INVENTION

The penetration of the silicone gel according to this invention is a value obtained when a Cone weight (9.38 g+0.025 g) is used in a ¼ scale cone penetrometer. This value must lie within the range 20–130 units, but more preferably within the range 40–100 units according to ASTM Designation D 1403-83 (¼ Scale Cone Penetrometer).

If the penetration is less than 20, the sheet is too hard, so there may be gaps when the filter is sealed, while if the penetration is greater than 130, the seal may be crushed by the weight of filter parts or torn when filter parts are replaced.

According to this invention, either a condensation type sealant that cures at room temperature or an addition type silicone gel composition that cures at room temperature may be used, but from the viewpoint of increasing curing speed for mass production, an addition type liquid silicone gel composition that cures with heating is particularly to be preferred.

If a condensation or addition type silicone gel composition that cures at room temperature is used, there is an advantage in that no equipment is required for curing, however this type of gel is unsuitable for mass production as a large number of molds are required for casting, and ample space is needed.

It is preferable that the liquid silicone gel composition has a pre-curing viscosity not exceeding 10,000 poise, however in order not to distort the mesh or weave of the mesh type reinforcing material to be described hereinafter, it is particularly preferable that this viscosity does not exceed 2,000 poise.

It is also preferable that the cured silicone gel contains no more that 0.5 wt % of low molecular weight siloxanes having a vapor pressure of 10 mmHg or higher at 200° C. If the silicone gel contains more than 0.5 wt % of low molecular weight siloxanes having a vapor pressure of 10 mmHg or higher at 200° C., there may be a detrimental effect on the microswitches or printed circuit boards in the filter apparatus installed in the clean room; and on the semiconductor-related parts that are being manufactured in the clean room.

The low molecular weight siloxanes in the silicone gel can be removed by post-cure of the cured silicone gel or by molecular distillation or stripping in the non-cured state.

The anti-dust gel sheet of this invention may be obtained by coating the silicone gel composition on a sheet like reinforcing material, and curing at room temperature or by heating. It may also be obtained by making a cured silicone gel adhere to a sheet like reinforcing material, but from the viewpoint of ease of molding, the former method is preferable.

A suitable thickness of the anti-dust gel sheet is in the range 3 mm–20 mm. If the gel sheet has a thickness less than 3 mm, the repeated use thereof may form space between the gel sheet and the filter support frame, while if the thickness thereof is greater than 20 mm, the reinforcing material is so distant from the sheet surface that the gel sheet may require the insertion of two sheet like reinforcing materials, thereby suffering economical disadvantage.

As for the thickness of the reinforcing material, it has no particular limitation, in so far as a gel layer can be provided on the material surface. In general, however, the reinforcing material having a thickness of the order of 0.1–2 mm can serve for the purpose.

According to this invention, the sheet like reinforcing material is used to reinforce the silicone gel and prevent deformation during handling. The reinforcing material may be a plastic sheet, a metal sheet or the like, it being preferable however to use a mesh type reinforcing material from the viewpoint of improving adhesion between the material and the gel, or due to the fact that this is advantageous in processes where the gel is treated on both surfaces. For molding purposes, it is preferable that voids in the aforesaid mesh type reinforcing material are in the range 20–95%.

If a fabric or a film with holes having less than 20% voids is used as reinforcing material, the uncured silicone gel composition supplied during molding does not reach the undersurface of the material. It is then necessary to perform the molding process twice, or to inject the gel on the upper and lower surfaces of the material simultaneously using a special mold.

It is therefore desirable that the reinforcing material is a cloth, as the silicone gel composition supplied then flows efficiently onto the underside of the material, and molding can easily be performed in one operation.

It is preferred that the gaps between the threads of the cloth reinforcing material are in the range 10 mm–1 mm, and particularly preferred that they are in the range 6 mm–3 mm. If the gaps are larger than 10 mm, the reinforcing effect is small and it is difficult to maintain the shape of the material. If on the other hand they are less than 1 mm, the voids hereintoforementioned tend to account for less than 20%.

The reinforcing material may be suitably chosen from materials that can form a sheet having a mesh wherein voids account for 20–95%, such as metal, plastic, natural fibers and synthetic fibers.

In particular, when an addition heat curing type of silicone gel composition is used, the reinforcing material is preferably made of heat-resistant nylon or polyester. If natural fibers such as cotton, hemp, silk or wool are used, these materials act as catalyst poisons in the addition reaction so that curing is partially impaired.

There is no particular limitation on the way nylon, polyester, acryl, rayon or acetate fibers in the material are woven together, but it is preferable that tangling weave is used as it does not easily lead to distortion of fiber intersections. Further, the mesh type reinforcing material need not be woven, but may also be a flat punched plastic film or a non-woven fabric.

The structure of the anti-dust gel sheet according to this invention is as shown in FIG. 1. In the figure, 1 is a silicone gel and 2 is a mesh type reinforcing material.

Figure 2:
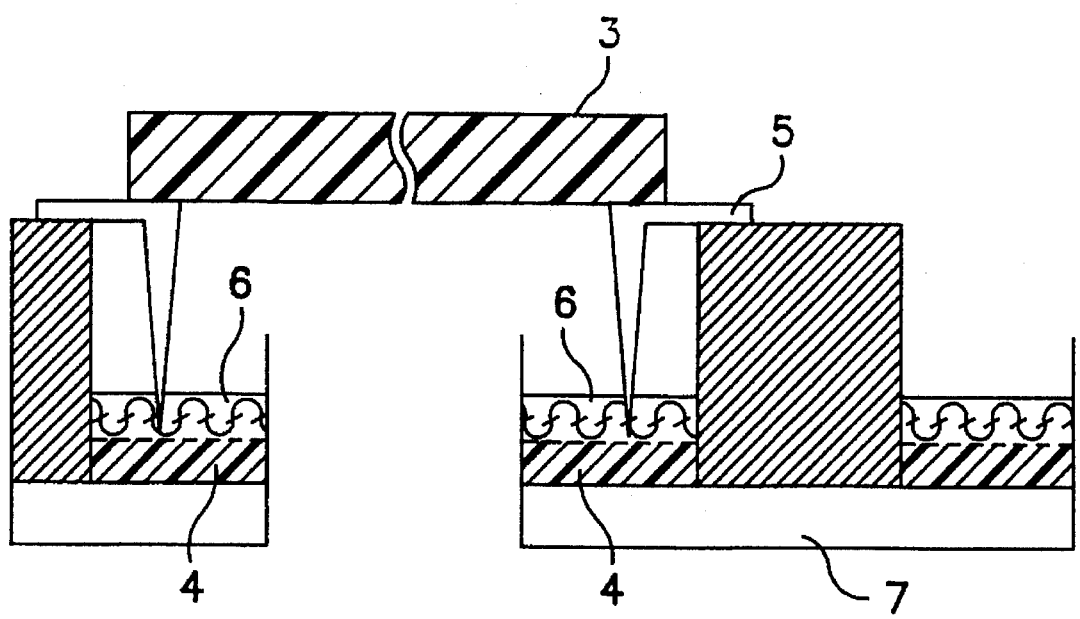
FIG. 2 shows a typical installation of an anti-dust gel sheet according to this invention.
Figure 3A:
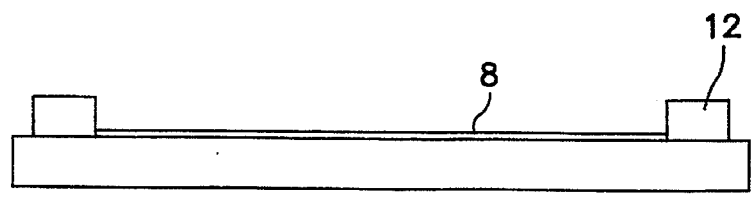
FIG. 3 is a drawing showing the process of manufacturing an anti-dust gel sheet according to this invention.
Figure 3B:
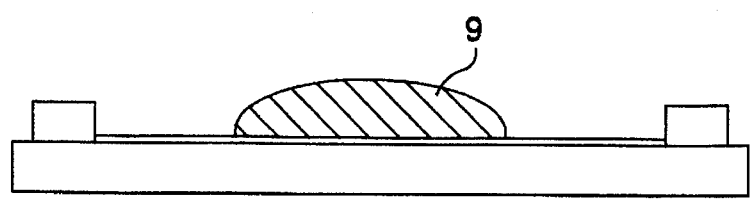
Figure 3C:
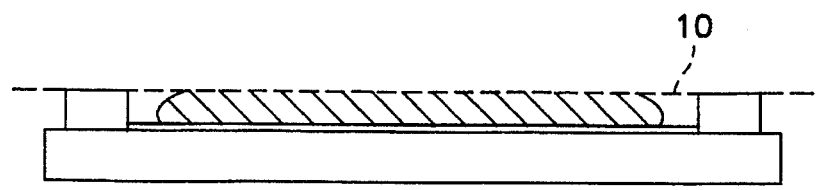
Figure 3D:
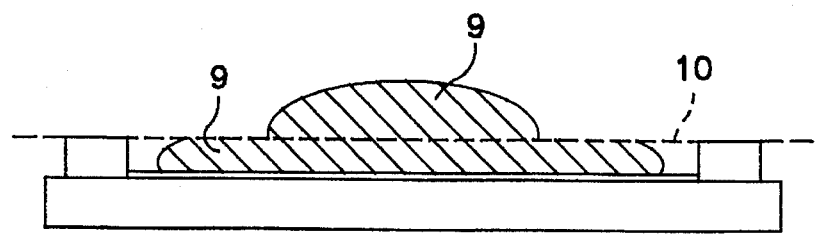
Figure 3E:
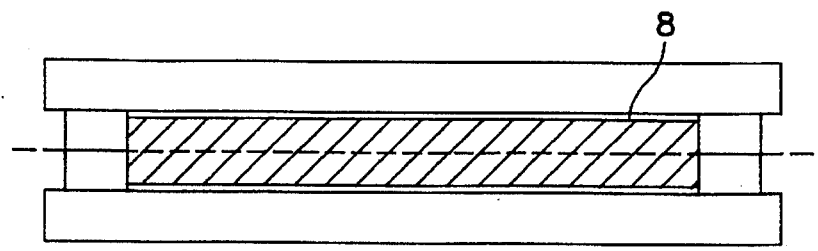
Figure 3F:
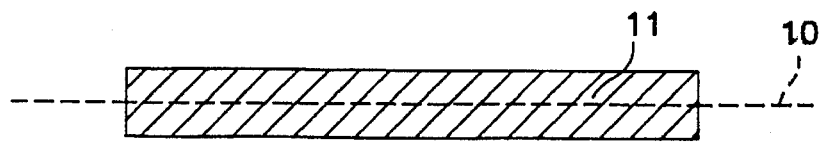

A typical installation of the anti-dust gel sheet according to the invention is shown in FIG. 2. In the figure, 3 is a filter, 4 is an anti-dust gel sheet, 5 is a filter support frame, 6 is a mesh type reinforcing material and 7 is a ceiling frame.

EXAMPLES

This invention will now be described in further detail with reference to specific examples, however it should be understood that the invention is not limited to these examples. The parts expressed in the examples are parts by weight, and all viscosities are values at 25° C.

Example 1

A PET film 8 (thickness 0.07 mm) was mounted on a 660 mm×340 mm press board, followed by a frame 12 of thickness 2.5 mm (external dimensions: 660 mm×340 mm, internal dimensions 620 mm×300 mm). Approx. 450 g of a well blended, degassed addition type curable liquid silicone gel composition 9 (commercial name KE1052A/B, Shin-Etsu Chemical Industries K.K.), was then injected. In preparing the silicone gel composition, the base polymer as a raw material was chosen from those containing low molecular weight siloxanes in a reduced content, and further subjected to a thorough stripping treatment.

Next, a polyester fabric 10 (voids approx. 60%, interthread gaps approx. 5 mm) was mounted, and a frame of thickness 2.5 mm (external dimensions 660 mm×340 mm, internal dimensions 620 mm×300 mm) was mounted on the fabric, Approx. 480 g of the aforesaid well blended, degassed KE1052A/B was then injected, a PET film 8 (thickness 0.07 mm) and press bard placed on top, and the assembly heated at 120° C. for 15 min so as to obtain a gel sheet 1 with a mesh cloth 2 (620 mm×300 m×5 mm) (FIG. 3).

Low molecular weight siloxanes having a vapor pressure of 10 mmHg or higher at 200° C. contained in the gel sheet so obtained accounted for 0.3 wt %, and the penetration of the silicone gel after curing was 65.

The gel sheet obtained was cut to a size of 610 mm×12 mm×5 mm to obtain a gel sheet(10,11 or 6,4) for a clean room.

The aforesaid sheet (4, 6) was inserted in the grooves of a ceiling frame (7) provided at a location where a filter component (3, 5) of the clean room was to be installed, and the filter component (3, 5) installed on the sheet (See FIG. 2).

When the filter component was removed 10 times, the gel sheet was not damaged in any way, showing that it provides good seal tightness even when used repeatedly.

Example 2

The same procedure as in Example 1 was followed, except that X-32-1268A/B (Shin-Etsu Chemical Industries K.K., commercial name of an addition curable type liquid silicone gel composition) was used instead of the KE1052A/B of Example 1, and a polyethylene terephthalate film (thickness 100 mm) having holes of diameter 3 mm at intervals of 10 mm, was used instead of the polyester fabric of Example 1. In the preparation of X-32-1268A/B, the base polymer which had undergone a thorough stripping treatment was used, in analogy with KE1052A/B used in Example 1.

A gel sheet (620 mm×300 mm×5 mm) having a punched film as reinforcing material was thereby obtained by molding.

Low molecular weight siloxanes having a vapor pressure of 10 mmHg or higher at 200° C. contained in the gel sheet so obtained accounted for 0.1 wt %, and the penetration of the silicone gel after curing was 90.

The gel sheet obtained was cut to a size of 610 mm×12 mm×5 mm to obtain a gel sheet for a clean room, and a test was performed wherein the gel sheet was used 10 times as seal for a filter component as in Example 1. The same good results were obtained as in Example 1.

Example 3

X-32-1341 (Shin-Etsu Chemical Industries K.K., product number of a condensation curable type liquid silicone gel) was used instead of the KE1052A/B of Example 1. In the preparation of X-32-1341, the base polymer which had undergone a thorough stripping treatment was used, in analogy with KE1052A/B used in Example 1.

The tools and polyester fabric of Example 1 were used. Curing was performed for 3 days at room temperature (25° C.) so as to obtain a gel sheet (620 mm×300 mm×5 mm) with a mesh cloth by molding.

Low molecular weight siloxanes having a vapor pressure of 10 mmHg or higher at 200° C. contained in the gel sheet so obtained accounted for 0.4 wt %, and the penetration of the silicone gel was 60. The gel sheet obtained was cut to a size of 610 mm×12 mm×5 mm to obtain a gel sheet for a clean room.

Using this gel sheet, a filter part was removed 10 times. The gel sheet was not damaged in any way, showing that it provides good sealtightness even when used repeatedly.

Example 4

The same procedure as in Example 1 was followed, excepting that KE104/Cat104=100/13 (Shin-Etsu Chemical Industries K.K., product number of an addition curable type liquid silicone gel) was used instead of the KE1052A/B of Example 1, and curing was performed by heating at 150° C. for 30 min.

A gel sheet for a clean room of dimensions 610 mm×12 mm×5 mm was thereby obtained. Low molecular weight siloxanes having a vapor pressure of 10 mmHg or higher at 200° C. contained in the gel sheet so obtained accounted for 1.1 wt %, and the penetration of the gel obtained was 30.

Using this gel sheet, a filter part was removed 10 times. The gel sheet was not damaged in any way, showing that it provides good sealtightness even when used repeatedly.

Comparative Example 1

The same procedure as in Example 4 was followed, except that the blending ratio of the KE104/Cat104 used in Example 4 was 100/16. A gel sheet for a clean room having a penetration of 10 was thereby obtained. When a filter part was fitted, parts with poor sealtightness appeared, and sealtightness was unsatisfactory unless the filter was fitted under a load.

Comparative Example 2

The same procedure as in Example 4 was followed, except that the blending ratio of the KE104/Cat104 used in Example 4 was 100/8.8. A gel sheet for a clean room having a penetration of 140 was thereby obtained. When a filter part was fitted and then removed, the gel proved to be too soft and suffered damage so that it could not be re-used.

Example 5

The same procedure as in Example 4 was followed, except that the blending ratio of the KE104/Cat104 used in Example 4 was 100/9.0. A gel sheet for a clean room having a penetration of 130 was thereby obtained. When a filter part was fitted and then removed, the gel proved to be rather soft, but it provided good sealtightness even when re-used 5 times.

What is claimed:

1. An anti-dust gel sheet comprising layers of a silicone gel, having a penetration of 20–130 units according to ASTM Designation D 1403-83 after curing, coated on both sides of a sheet of reinforcing material, said gel sheet having anti-dust properties.

2. An anti-dust gel sheet according to claim 1, wherein said silicone gel is a cured material of an addition curable liquid silicone gel composition.

3. An anti-dust gel sheet according to claim 1, wherein said silicone gel is a cured material of a condensation curable liquid silicone gel composition.

4. An anti-dust gel sheet according to claim 1, wherein said reinforcing material is a mesh reinforcing material.

5. An anti-dust gel sheet according to claim 4, wherein said mesh reinforcing material is formed from a polyester fiber.

6. An anti-dust gel sheet according to claim 4, wherein said mesh reinforcing material is formed from a cotton fiber.

7. An anti-dust gel sheet according to claim 1, wherein said silicone gel is a silicone gel comprising no more that 0.5 wt % of siloxanes having a vapor pressure of 10 mmHg or higher at 200° C.

8. An anti-dust gel sheet according to claim 1, wherein the layers of silicone gel each have a thickness of 3–20 mm.

9. An anti-dust gel sheet according to claim 1, wherein the reinforcing material has a thickness of 0.1–2 mm.

* * * * *